March 17, 1959 P. D. BERMINGHAM 2,878,084
SEAL FOR ROLLER BEARING UNIT
Filed Dec. 30, 1953 2 Sheets-Sheet 1

INVENTOR.
PETER D. BERMINGHAM
BY
ATTORNEY

March 17, 1959     P. D. BERMINGHAM     2,878,084
SEAL FOR ROLLER BEARING UNIT
Filed Dec. 30, 1953     2 Sheets-Sheet 2

INVENTOR.
PETER D. BERMINGHAM
BY
*R. William Freeman*
ATTORNEY

United States Patent Office 2,878,084
Patented Mar. 17, 1959

2,878,084
SEAL FOR ROLLER BEARING UNIT
Peter D. Bermingham, Suffield, Ohio
Application December 30, 1953, Serial No. 401,221
14 Claims. (Cl. 308—187.1)

This invention relates to a device for establishing a fluid tight seal between relatively rotatable parts, and in particular relates to a sealing device adapted to be used in connection with the establishment of a seal in roller bearings.

For a long time past, roller bearings of varied types have been utilized to permit rotational movement between relatively movable parts. Regardless of the type of construction that is employed, all roller type bearings are subjected to severe frictional wear, and accordingly the same must be maintained in a properly lubricated condition at all times to avoid abnormal bearing wear. Similarly, the bearing surface must be kept free of dirt or other foreign objects in view of the fact that the same would operate as an abrasive to mar or scratch the bearing surface, thereby destroying prematurely the effectiveness of the bearing.

From the foregoing, it is manifest that a theoretically perfectly lubricated bearing would last indefinitely. However, this indefinite life, that is theoretically obtainable, has not been realized due to a failure to either (1) keep the bearing surface properly lubricated, or (2) keep the bearing surface free from the presence of dirt or other foreign objects. In many cases the sealing means employed fail in both the foregoing regards.

In the main, the prior art devices have been constructed on the basis that a seal that would serve to retain lubricant therein would automatically, by virtue of its construction, exclude the presence of dirt and other foreign objects from the interior face of the seal. This thesis has repeatedly been disproven in the prior art, and accordingly, those seals that have been developed along the lines employed in fluid sealing invariably fail because of the entrance of dirt, grit, etc., into the bearing proper. Converse approaches, directed primarily at the exclusion of dirt and other foreign matter, have invariably resulted in scored bearings because of the inability of such type of construction to prevent the continual escape of lubricant from the interior of the seal.

Accordingly, it is one object of this invention to provide a bearing seal that will perform the dual function of retaining lubricant within the bearing, and at the same time exclude dirt and other foreign objects from the interior thereof.

It is a further object of this invention to provide a bearing seal that will automatically adjust itself to compensate for pressure extremes applied either internally or externally of said bearing.

It is a still further object of this invention to provide a bearing seal provided with independent separate sealing edges designed to simultaneously react to obviate the escapement of lubricant and the entrance of foreign matter, respectively.

These and other objects of the invention will become more apparent upon examination of the following brief specification, taken in the light of the accompanying drawings.

Figure 1:
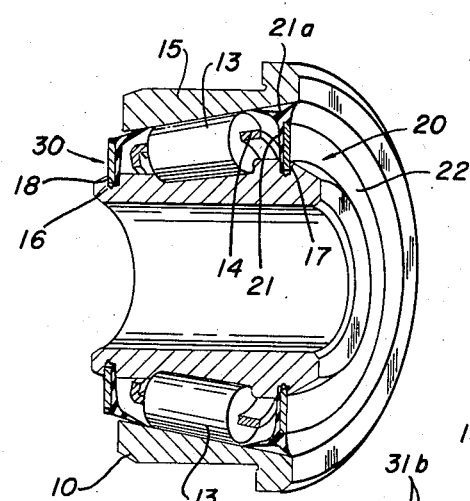
Figure 1 is an enlarged cross-sectional view, partly broken away in sections to illustrate component parts.

Referring now to the drawings, and in particular to Figures 1, 2, 3, and 4 thereof, the component parts of the sealing mechanism are shown incorporated interiorly of a tapered roller bearing unit 10, that is illustrated as being interposed between a shaft 11, and a relatively rotatable cylinder 12, in a manner well known in the prior art. With the exception of the sealing discs 20 and 30, that are shown provided in the bearing unit 10 for sealing purposes in the manner to be described, the bearing unit 10 is conventional in every respect. Accordingly, the same is shown as including a plurality of tapered roller bearings 13, 13, each of which is positioned between the cup 15 and the cone 16 by a cage 14 that also functions to maintain an equal distance between the axes of the respective tapered roller bearings 13, 13.

For the dual purpose of lubricating the surfaces of the bearings 13, 13 and keeping the same free from the presence of foreign matter, the cone 16 is shown provided with a pair of annular grooves 17, 18 that are located on opposite ends of the tapered roller bearings for reception therein of the sealing discs 20 and 30 respectively.

Before proceeding with a detailed description of the sealing discs 20 and 30, it is manifest that theory governing the construction of these discs be first understood.

Accordingly, it is to be noted that the effectiveness of a rotational sealing unit is directly proportional to degree of engagement between the respective component elements of the sealing unit. For example, many sealing faces are lapped or otherwise polished and then tensionally urged into rotational engagement in an attempt to increase, to some extent, the effectiveness of the seal. However, all efforts in this direction are regulated by the necessary clearance that is required to permit free relative movement therebetween in view of the frictional forces involved in rotational type seals. Thus it is manifest that a theoretically perfect "surface to surface" engagement of component elements cannot be obtained in view of the frictional factor involved.

It has been discovered in this invention, that sealing discs, of certain construction, will greatly reduce the amount of frictional forces involved in rotational type seals, with the result that a heretofore unattainable degree of "surface to surface" engagement is possible in rotational seals employing the novel sealing discs. In essence, the sealing discs are constructed to present the minimum possible amount of surface area for engagement with the cooperating sealing face. To this end all edge portions that engage the sealing face are tapered to present a highly feathered edge. These feathered edges are bounded by adjacent tapered areas that converge to define the feathered edge that constitutes the sealing surface. In practice, this feathered edge is made as thin as possible in view of the fact that an infinite edge would result in a perfect seal because no frictional forces would be involved. The closer this point is approached, the better the seal that is attainable in view of the corresponding reduction in frictional forces involved.

In addition to the reducing of the frictional forces involved as just described, sealing by use of a feathered edge is advantageous in that the same precludes passage of particles larger than the sealing surface itself. Thus, if the sealing surface that is defined by the feathered edge is $\frac{1}{1000}$ of an inch, only particles smaller than $\frac{1}{1000}$ of an inch will be permitted passage by the feathered edge. As before, it is manifest that the smaller the feathered edge, the better the seal.

Further in this regard, the feature of the feathered edge is advantageous in that same, during relative rotation, serves as knife edge, that reduces the size of particles seeking entrance or exit with respect to the seal. This serves to reduce said particles to the size where the entrance or exit past the seal does not result in damage to the same.

A still further advantage is found in the fact that such a feathered edge will not require a great amount of maintenance, due to the fact that its engagement with the sealing face at an oblique angle will cause the same to automatically sharpen itself during operation.

Figures 3, 4:
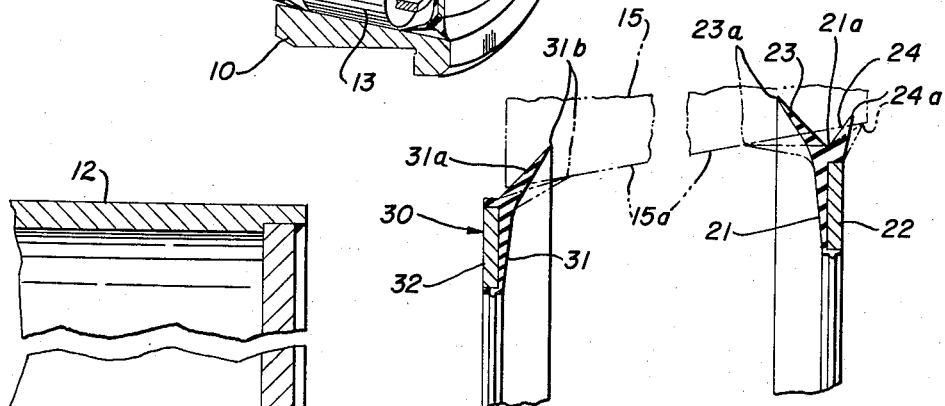
Figure 3 is an enlarged cross-sectional elevation of one of the sealing units, and illustrating in chain dotted lines the position of the sealing edge thereof when applied in the bearing unit.
Figure 4 is a cross-sectional elevation of another component of the sealing unit and illustrating in chain dotted line the position of the same when applied interiorly of the bearing unit.

Turning now to the construction of the sealing discs per se, the sealing disc 20, that is positioned in non-rotatable relationship within the groove 17, is shown as including a disc 21, made of rubber or other resilient material that may be reinforced by a metallic, or other non-yieldable disc 22, incorporated therein as best shown in Figure 4. The remaining peripheral edge portion 21a of the disc 21, that is presented radially outwardly from the periphery of the reinforcing disc 22, is shown as being bifurcated adjacent the extreme perimeter thereof so as to present a pair of divergently extending ribs 23, 24 that are shown in cross-section as being tapered to present a pair of extremely thin feathered edge portions 23a, 24a, respectively, designed for engagement at an oblique angle with the internal face 15a of the cup 15. (See Figure 2.) As previously explained, this feathered edge is made as thin as possible to obtain maximum sealing efficiency.

Because the sealing disc 30 is presented interiorly of the bearing unit 10, the same is not required to function as a dirt stop in the sealing unit of Figures 1–4. Accordingly, the sealing disc 30 is shown as including an annular disc 31 of rubber or other resilient material that may be reinforced by a metallic, or other non-yieldable disc 32, as best shown in Figure 4. As before, however, the peripheral edge portion of the disc 31 that extends radially outwardly beyond the periphery of the reinforcing disc 32 is shown as being formed at an oblique angle to the plane of the disc 31 so as to define a tapered sealing edge 31a that terminates in a feathered sealing edge 31b. As before, this feathered sealing edge 31b is engaged at an oblique angle with the internal face 15a of the cup 15.

Figure 2:
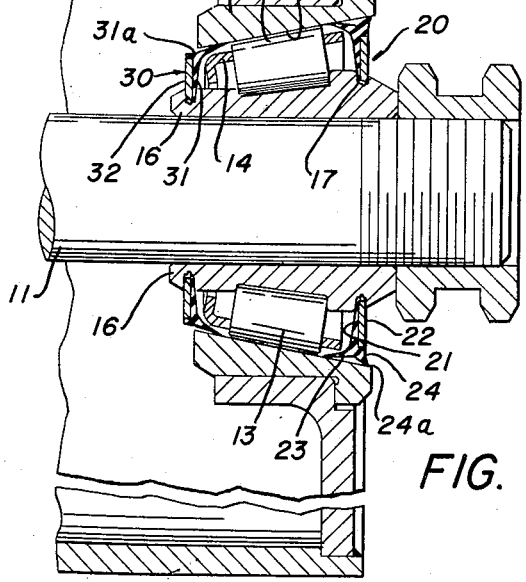
Figure 2 is a cross-sectional elevation illustrating one preferred form of the invention as the same is utilized in conjunction with a conveyor roll.

In use or operation of the improved sealing means in conjunction with a standard roller bearing unit 10 of the type described, the sealing discs 20 and 30, together with the reinforcing plates 22 and 32, incorporated therein, are positioned on opposed ends of the tapered bearing 13 within the grooves 17 and 18 respectively, and distorted to the position of Figure 2. In this position, a lubricating medium may be introduced between the sealing units 20 and 30 as, for example, by utilization of a syringe to pierce the sealing disc 21 in the area that extends radially outwardly from the periphery of the reinforcing disc 22.

Figure 5:
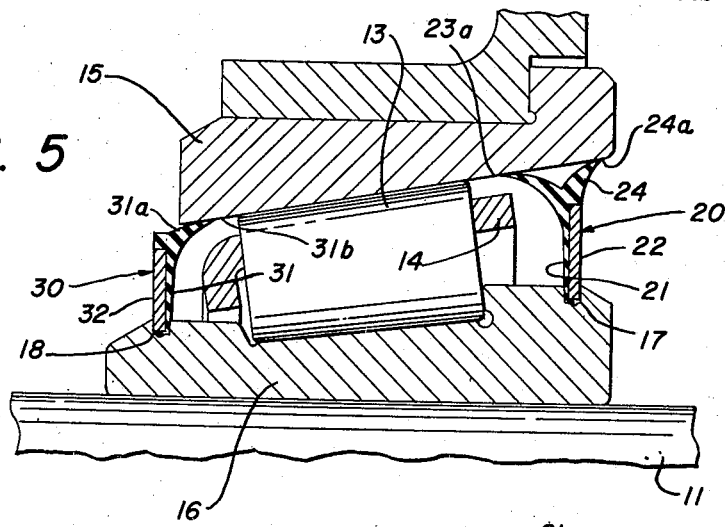
Figure 5 is an enlarged cross-sectional elevation showing the sealing unit being subjected to abnormal internal pressure.

With the lubricating medium thus positioned interiorly of the chamber defined by the sealing discs 20 and 30, escape of lubricating medium will be obviated. In the event there is a build-up in internal pressure of the bearing unit 10, the sealing discs 20 and 30 will be forced to the position of Figure 5. In this position, the surface area sealed will be increased by virtue of the increased amount of periphery engaged by the inner face 15a of the cup 15. As this internal pressure is diminished, the inherent resiliency of the sealing discs 20 and 30 will cause the same to return to the position of Figure 2.

By like token, it is manifest that the rotational engagement of the feathered edge 24a with the cup 15 will serve to obviate the entrance of any dirt or foreign matter interiorly of the bearing unit 10. It is equally manifest that if any dirt did escape past the feathered edge 24a, the same would have to further pass the seal provided by the feathered edge 23a against the internal wall 15a of the cup 15. Thus, a dual seal is provided against the entrance of dirt or other foreign objects into the interior of the bearing unit 10. In like manner, a dual seal is provided against the escape of the lubricating medium past the sealing disc 20. For example, if fluid would pass the extreme feathered edge portion 23a, complete escape would still require further passage with respect to the peripheral edge 24a. (See Figure 2.)

It will be seen from the foregoing that there has been provided a new and novel approach to the problem of retaining a lubricating medium around a roller bearing unit, while at the same time preventing the entrance of dirt or other foreign objects to the bearing surface. The device that has been employed has utilized sealing discs having extremely thin feathered edges for engagement with the common sealing face. Also a pair of sealing edges have been used, one sealing edge acting as a primary seal against the escape of lubricant, while the other sealing edge acts as a primary seal against the entrance of foreign objects. It has also been shown how each of these feathered sealing edges will act as a primary seal for one purpose and an auxiliary seal for the other prime purpose. Additionally, the novel seal described has been found capable of automatically compensating for sudden unexpected increases in pressure extremes that had previously caused bearing failure.

Figure 6:
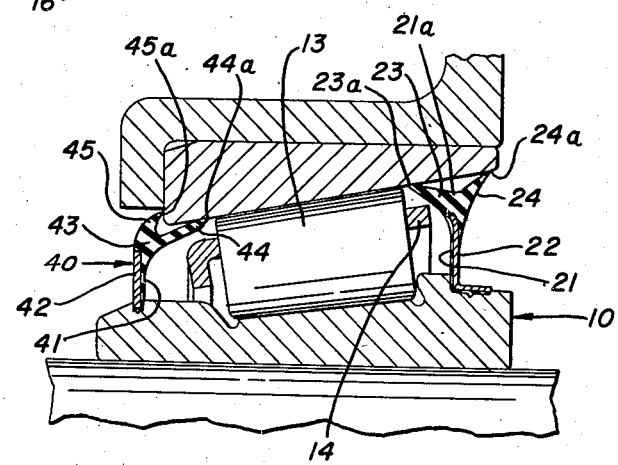
Figure 6 is a cross-sectional view illustrating a modified form of the invention.

In Figure 6 of the drawings, there is shown a modified form of the invention, designed for use in applications where the bearing unit is open on both ends thereof.

In this form of the invention, the entrance of dirt must be prevented on both axial ends of the bearing units 13, 13. All parts, with the exception of the sealing unit 40, are of the same construction as we previously discussed in conjunction with Figures 1 to 5. Accordingly, like parts indicate like numbers.

With reference to the construction of sealing unit 40, the same is shown as including an annular sealing disc 41 of rubber or other resilient material. As before, the same (disc 41) may be reinforced by a metallic disc 42. Because the sealing disc 41 must serve the dual function of preventing the escape of lubricant, as well as preventing the entrance of dirt or other foreign objects into the bearing unit 10 per se, the peripheral edge portion thereof extends radially outwardly from the periphery of the annular disc 42 at an oblique angle to the plane of the disc 41. Also, this oblique extension is shown bifurcated as at 43 so as to present outwardly divergent tapering ribs 44 and 45, that converge in cross section to define a pair of feathered edges 44a and 45a, respectively, that engage in sealing relationship with surface portions of the cup 15 in a manner best shown in Figure 6, to retain the cup and cone in unit relationship.

It will be seen that this modification of the invention merely contemplates the provision of dual sealing against (1) the entrance of dirt, and (2) the escape of lubricant, at both axial ends of the tapered roller bearing 13 instead of only at the one end as was previously contemplated and discussed in conjunction with Figures 1–5 of the drawings.

Figure 7:
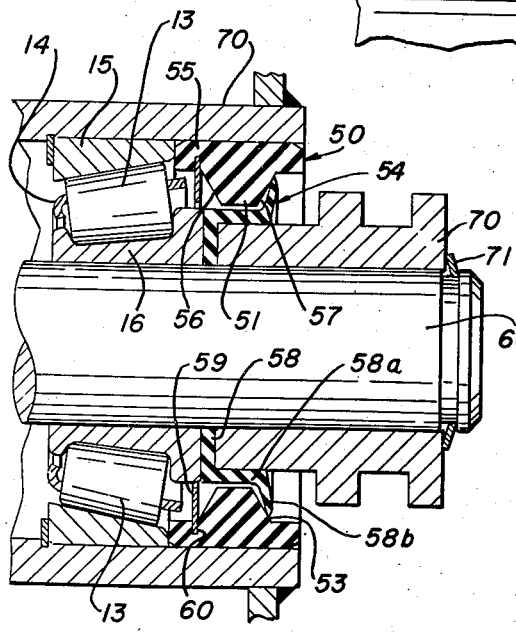
Figure 7 is an enlarged cross-sectional view illustrating a modified form of sealing unit that can be utilized in similar roller bearing applications.

The modified form of the invention shown in Figure 7 is intended for application in conjunction with bearing units wherein the usable face area of the cup 15 and the cone 16 is so severely restricted that sealing units of the type employed in Figures 1–7 cannot be incorporated or utilized in conjunction with the conventional cone and cup of a standard roller bearing unit.

Accordingly, in this form of the invention, the cup 15 and cone 16 are shown separated by the conventional cage 14 that supports and aligns the usual tapered roller bearing units 13, 13 as has previously been described.

In this form of the invention, however, the two piece sealing unit per se, generally designated as 50, is shown as including a sealing element 51 having an inclined sealing face thereon for engagement with the peripheral feathered edge portion 53 of a relatively rotatable second sealing element that is generally designated as 54.

With regard to the construction of the sealing element 51, the same is shown as including an annular disc 55 fixed with respect to the cylinder 70, and having a pair of inclined faces 56 and 57 extending radially inwardly therefrom as best shown in Figure 7 of the drawings. For the purpose of providing a lubricant shield to serve as a primary baffle against the internal pressure created by the centrifugal force of the lubricants, the sealing unit 51 is shown provided with a radial disc 59 fixed within a groove 60.

Turning now to the construction of the second sealing element 54, the same is shown as including a disc 58 that is fixed with respect to the shaft 60 and the cone 16. For the purpose of providing sealing engagement with the sealing face 57, the sealing disc 58 is shown offset as at 58a, so as to present a feathered edge portion 58b, that is engageable against the inclined face 57 of the sealing element 51 at an oblique angle. As can best be seen from the drawings, the feathered edge portions 58b is distorted out of its normal position of parallelism with respect to the disc 58, whereby the same will be continually tensionally engaging the surface 57 at an oblique angle by virtue of inherent recovery properties thereof.

In use or operation of this modified form of the invention, the roller unit 10 is first assembled in a conventional manner and inserted between the shaft 60 and the cylinder 70 to permit relative movement therebetween. The sealing element 51 is then positioned interiorly of the cylinder 70 so as to abut the cup 15. With the sealing member 51 thus positioned, the second sealing element 54 is positioned around the shaft 60 and is retained in close relationship with respect to the cone 16 by virtue of a spacer block 70 that is held in axial relationship with respect to the shaft 60 by a clip 71 in a manner well known in the art.

During operation of this improved modification of the invention, fluid seeking escape will be first met by primary seal in the form of the baffle 59. Fluid that succeeds in escaping past this primary seal will eventually wind itself through the labyrinth defined by the sealing elements 51 and 54. Upon reaching the inclined surface 57, further escape will be prevented by virtue of the seal between the feathered edge 58a and the inclined surface 57.

It has been shown in Figure 6 how the sealing disc 41 is operable to retain the standard cup and cone in unit relationship during operation by use of a rib 45. This permits usage of a preassembled unit bearing. It is equally manifest that the sealing disc 31 of Figures 1–5 could be provided with a second rib equivalent to the rib 45 of Figure 6 to accomplish this purpose. This is not shown in Figures 1–5 for the sake of clarity, but it is to be understood that this second rib, designed for retaining cup and cone as a unit, could be incorporated in Figures 1–5 without the exercise of invention.

Other modifications may be resorted to without departing from the spirit thereof or the scope of the appended claims.

What is claimed is:

1. A tapered roller bearing, comprising; a cup having a radially extending end wall abutting a tapered internal surface that defines an outer raceway inclined to the axis of said cup; a cone having an external surface defining an inner raceway inclined about the axis of said cone; a plurality of tapered bearings received in the race defined by said raceways of said cup and said cone; an apertured sealing disc having the inner peripheral edge portion thereof received on said external surface of said cone adjacent one axial end of said bearings and having the outer peripheral edge portion thereof bifurcated to define divergent sealing edges engageable with said internal surface of said cup adjacent the large diameter end thereof; a second apertured sealing disc having the inner peripheral edge portion thereof received on said external surface of said cone adjacent the opposed axial end of said bearings, and having the outer peripheral edge portion thereof bifurcated to define divergent sealing edges respectively engageable with said end wall and said internal surface of said cup adjacent the small diameter end thereof.

2. A roller bearing unit, comprising; a cup having an inner race; a cone having an outer race; roller bearings operatively associated with said races; a cage retainer holding and spacing said roller bearings apart; sealing means carried by said cone at both axial ends of said roller bearings for preventing loss of lubricant from said roller bearings; said sealing means at the small diameter end of said cone cooperating with said cup for retaining said cup, said cone, said roller bearings and said cage together as a unit.

3. A tapered roller bearing assembly, comprising; a cup; a cone; tapered bearings therebetween; a cage for spacing said bearings; and sealing means carried by said cone at the small diameter end thereof and cooperating with said cup at the small diameter end thereof to restrict relative axial movement between said cup and said cone.

4. A roller bearing unit, comprising; a cup; and a cone assembly, operably associated therewith; said cup including an inner race defined by axial end walls; said cone assembly including a cone having an outer race; roller bearing members receivable against said outer race; cage means for retaining and spacing said roller bearings on said outer race; and sealing means carried by said cone at the small diameter end thereof and cooperating with said small diameter axial end of said cup, upon telescoping of said cup and said cone assembly to prevent relative axial movement therebetween.

5. A roller bearing unit, comprising; a cup; and a cone assembly, operably associated therewith; said cup including an inner race defined by axial end walls; said cone assembly including a cone having an outer race; roller bearing members receivable against said outer race; cage means for retaining and spacing said roller bearings on said outer race; and sealing means carried by said cone at the small diameter end thereof and releasably interlocking with said cup upon telescoping of said cone assembly with respect to said cup, whereby relative axial movement between said telescoped cup and cone assembly is restricted.

6. A roller bearing unit, comprising; a cup; and a cone assembly, operably associated therewith; said cup including an inner race defined by axial end walls; said cone assembly including a cone having an outer race; roller bearing members receivable against said outer race; cage means for retaining and spacing said roller bearings on said outer race; and sealing means carried by said cone at the small diameter end thereof and tensionally engaging against a portion of said small diameter axial end wall of said cup upon telescoping of said cone assembly with respect to said cup, whereby relative axial movement between said telescoped cup and cone assembly is restricted.

7. A roller bearing unit, comprising; a cup; and a cone assembly, operably associated therewith; said cup including an inner race defined by axial end walls; said cone assembly including a cone having an outer race; roller bearing members receivable against said outer race; cage means for retaining and spacing said roller bearings on said outer race; and a resilient sealing ring carried by said cone assembly at the small diameter end thereof; said sealing ring having a greater diameter than said smallest diameter of said cup, whereby during assembly of said cone assembly and said cup the peripheral edge of said ring may be deflected during axial movement past said small diameter portion of said cup to permit the inherent recovery properties of said ring to urge the same against said small diameter axial end wall after passing said small diameter portion of said cup; said contact between said small diameter axial end and said edge portion of said ring restricting relative axial movement between said assembled cup and cone.

8. A tapered roller bearing, comprising; a cup having an axial end wall adjoining a tapered internal surface that defines an outer raceway inclined to the axis of said cup; a cone having an external surface defining an inner raceway inclined about the axis of said cone; a plurality of tapered bearings received in the race defined by said raceways of said cup and said cone; an apertured sealing disc having the inner peripheral portion thereof received on said external surface of said cone adjacent one axial end of said bearings and having the outer peripheral edge portion thereof bifurcated to define divergent sealing edges engageable with said internal surface of said cup adjacent the large diameter end thereof; a second apertured sealing disc having the inner peripheral portion thereof received on said external surface of said cone adjacent the opposed axial end of said bearings, and having the outer peripheral portion thereof bifurcated to define divergent sealing edges respectively engageable with said axial end wall and said internal surface of said cup adjacent the small diameter end thereof.

9. A tapered roller bearing, comprising; a cup having an axial end wall adjoining a tapered internal surface that defines an outer raceway inclined to the axis of said cup; a cone having an external surface defining an inner raceway inclined about the axis of said cone; a plurality of tapered bearings received in the race defined by said raceways of said cup and said cone; an apertured sealing disc having the inner peripheral portion thereof received on said external surface of said cone adjacent the small diameter end of said bearing and having the outer peripheral portion thereof bifurcated to define divergent sealing edges respectively engageable with said axial end wall and said internal surface of said cup adjacent the small diameter end thereof.

10. A tapered roller bearing assembly, comprising; a cup; a cone; tapered bearings therebetween; a cage for spacing said bearings; and sealing means carried by said cone at the small diameter end thereof and having a portion thereof cooperating with said cup at the small diameter end thereof to restrict relative axial movement between said cup and said cone.

11. A tapered roller bearing assembly, comprising; cup means including a cup having a race and an axial end surface out of parallel with said race; a cone having a race; tapered bearings therebetween; a cage for spacing said bearings; and a sealing disc carried by said cone at one axial end thereof and projecting radially of the axis of rotation thereof; said sealing disc having a bifurcated peripheral edge portion, with one said bifurcated edge being engageable against said end surface of said cup in sealing contact therewith, said remaining bifurcated edge being in sealing contact with said cup means.

12. A tapered roller bearing assembly, comprising; a cup having an internal race extending between different diameter opposed axial ends thereof; a cone having its external dimension between the opposed axial ends thereof defined by an external race and a contiguous support surface adjacent thereto; a plurality of roller bearings operatively disposed between the races of said cup and said cone; a sealing disc carried by said support surface and projecting radially of the axis of rotation of said cone; said sealing disc having a flexible peripheral edge portion engaging said internal race of said cup under compression; said resilient sealing disc being disposed between the axial ends of said cup and having a diameter less than the large diameter end of said cup and larger than the small diameter of said cup.

13. A tapered roller bearing assembly, comprising; a cup having an internal race extending between the opposed axial ends thereof; a cone having its external dimension between the opposed axial ends thereof defined by an external race and a contiguous support surface adjacent thereto; a plurality of roller bearings operatively disposed between the races of said cup and said cone; a sealing disc carried by said support surface and projecting radially of the axis of rotation of said cone; said sealing disc having a flexible peripheral edge portion engaging said internal race of said cup under compression; said resilient sealing disc being disposed between the axial ends of said cup in substantial parallelism therewith; said flexible peripheral edge surface being bifurcated; said bifurcations being of unequal length whereby the same will engage said race of said cup at axially spaced points.

14. The device of claim 13 further characterized by the fact that said bifurcated portions engage said race at approximately equal pressures.

References Cited in the file of this patent

UNITED STATES PATENTS

| | | |
|---|---|---|
| 2,015,206 | Tyson | Sept. 24, 1935 |
| 2,310,607 | Batesole | Feb. 9, 1943 |
| 2,348,587 | Antonelli | May 9, 1944 |
| 2,415,888 | Joy | Feb. 18, 1947 |
| 2,467,049 | Peterson | Apr. 12, 1949 |
| 2,657,104 | Kayser | Oct. 27, 1953 |
| 2,690,362 | Kindig | Sept. 28, 1954 |

FOREIGN PATENTS

| | | |
|---|---|---|
| 445,943 | Great Britain | Apr. 22, 1936 |
| 546,260 | Great Britain | July 3, 1942 |